United States Patent [19]
Beears

[11] 3,839,274
[45] Oct. 1, 1974

[54] POLYOLEFINS STABILIZED WITH THIOPROPIONAMIDES AND PHENOLS

[75] Inventor: Warren L. Beears, Brecksville, Ohio

[73] Assignee: The B. F. Goodrich Company, New York, N.Y.

[22] Filed: Apr. 16, 1973

[21] Appl. No.: 351,280

Related U.S. Application Data

[63] Continuation-in-part of Ser. No. 873,650, Nov. 3, 1969, abandoned.

[52] U.S. Cl.................... 260/45.8 N, 260/45.9 NC
[51] Int. Cl. ........................................... C08f 45/60
[58] Field of Search.............. 260/45.8 NT, 45.9 NC

[56] References Cited
UNITED STATES PATENTS

| | | | |
|---|---|---|---|
| 2,792,307 | 5/1957 | Chenicek | 99/163 |
| 3,531,483 | 9/1970 | Gilles | 260/248 |
| 3,538,092 | 11/1970 | Dexter | 260/248 |

*Primary Examiner*—Melvyn I. Marquis
*Assistant Examiner*—R. A. White
*Attorney, Agent, or Firm*—J. Hughes Powell, Jr.

[57] ABSTRACT

Highly effective stabilizer systems are obtained when bis- thio propionamides are employed in combination with certain phenols. Especially useful thio propionamides include N,N'-methylene-bis[$\beta$-(arylthio)propionamides] and N,N'-methylene-bis[$\beta$-(alkylthio)propionamides]. The phenolic stabilizers are derived from isocyanurates and 1,3,5-triazines. The combinations are particularly useful for the stabilization of polyethylene and polypropylene.

8 Claims, No Drawings

POLYOLEFINS STABILIZED WITH THIOPROPIONAMIDES AND PHENOLS

CROSS REFERENCE TO RELATED APPLICATION

This application is a continuation-in-part of application Ser. No. 873,650 filed Nov. 3, 1969 now abandoned.

BACKGROUND OF THE INVENTION

Although polyolefins are subject to degradation due to oxidative, thermal and photochemical effects, quite stable polyolefin compositions are obtained if small amounts of certain thio compounds are incorporated therein. Thiodipropionates, for example, are effective by themselves and in combination with other conventional stabilizers, especially phenolic stabilizers, for the stabilization of polyethylene and polypropylene.

It is desirable to obtain highly effective stabilizer systems, particularly where the stabilizer components are high molecular weight compounds since, in general, the volatility of these compounds is more favorable to high temperature processing.

SUMMARY OF THE INVENTION

Excellent activity is obtained when bis- thiopropionamide stabilizers are employed in combination with phenolic stabilizers derived from isocyanurates or 1,3,5-triazines. The stabilizer systems are effective for the prevention of oxidative, thermal and photochemical degradation of polyolefins, particularly polyethylene and polypropylene. N,N'-methylene-bis[β-(alkylthio)-propionamides] and N,N'-methylene-bis[β-(arylthio)-propionamides] are particularly useful when used in combination with tris(3-alkyl-4-hydroxybenzyl-)isocyanurate. The stabilizer system will be present in an amount between about 0.01 percent and 5 percent by weight of the total composition. Exceptional activity is observed in polyethylene and polypropylene when the weight ratio of the two stabilizer components is between about 5:1 to about 1:5.

DETAILED DESCRIPTION

This invention relates to a new stabilizer system effective for the stabilization of polyolefins particularly polyethylene and polypropylene. The present stabilizer system contains at least one thio propionamide compound, that is, a compound containing the molecular grouping

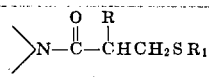

(1)

wherein R is a hydrogen or a methyl radical and $R_1$ is an alkyl group containing from eight to 24 carbon atoms, an aryl group, or an aralkyl or alkaryl group containing from six to 20 carbon atoms. Excellent results are obtained when $R_1$ is an alkyl radical containing from eight to about 18 carbon atoms or a phenyl, a benzyl or a naphthyl radical. The aryl groups may contain other substituents which do not interfere with the activity of the thio function such as halogens and similar groups. The presence of such groups on the aryl group often even enhance the activity of these compounds.

Especially useful bis-thio propionamides will utilize an alkylene radical containing from one to eight carbon atoms, and preferably a methylene radical, as a nucleus for bonding two groups of the type (I). Excellent results have been obtained with N,N'-methylene-bis[β-(alkylthio)propionamides] and N,N'-methylene-bis[β-(arylthio)propionamides] having the structural formula

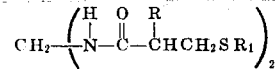

wherein R and $R_1$ are the same as defined above. Compounds of the above type useful in the present invention include N,N'-methylene-bis[β-(octylthio)propionamide], N,N'-methylene-bis-[β-octylthio)-α-methylpropionamide], N,N'-methylene-bis[β-(nonylthio)propionamide], N,N'-methylene-bis[β-(dodecylthio)propionamide], N,N'-methylene-bis[β-(dodecylthio)-α-methylpropionamide], N,N'-methylene-bis[β-(tridecylthio)propionamide], N,N'-methylene-bis[β-(tetradecylthio)propionamide], N,N'-methylene-bis[β-(hexadecylthio)propionamide], N,N'-methylene-bis[β-(octadecylthio)propionamide], N,N'-methylene-bis[β-(octadecylthio)-α-methylpropionamide], N,N'-methylene-bis[β-(eicosylthio)propionamide], N,N'-methylene-bis[β-(phenylthio)propionamide], N,N'-methylene-bis[β-(phenylthio)-α-methylpropionamide], N,N'-methylene-bis[β-(naphthylthio)propionamide], N,N'-methylene-bis[β-(p-chlorobenzylthio)propionamide], N,N'-methylene-bis[β-(p-chlorobenzylthio)-α-methylpropionamide], and the like.

The thio propionamide compounds are conveniently prepared by reacting a mercaptan with a compound containing acrylyl or methacrylyl substitution. For example, to obtain the N,N'-methylene-bis[β-(alkylthio)-propionamides, 2 mols of the alkyl mercaptan are reacted with 1 mol methylene-bisacrylamide or methylene-bismethacrylamide. The reactions are generally conducted in a solvent medium in the presence of a basic catalyst. The catalyst can be an alkali or alkaline earth metal hydroxide or quaternary ammonium hydroxide such as trimethylbenzyl ammonium hydroxide or tetramethyl ammonium hydroxide. Other basic compounds including amines, such as triethyl amine, and alkali metal alkoxides, such as sodium methoxide, may also be employed to catalyze the reaction. The reaction is generally conducted at an elevated temperature not exceeding about 70° C. To avoid undue polymerization through the acrylyl or methacrylyl groups a small amount of any conventional polymerization inhibitor, such as 2,6-di-t-butyl-p-cresol, can be added to the reaction mixture.

The stabilizer systems of the present invention, in addition to the bis- (thio propionamide), will contain at least one additional stabilizer compound. Particular advantage is obtained when the thio propionamides are employed in combination with certain other stabilizer compounds of the phenolic type having one or more hindered phenol groups substituted on a six-membered nitrogen-containing heterocyclic ring structure. The heterocyclic nucleus will contain three alternating nitrogen heteroatoms, that is, in the 1,3 and 5 ring positions. When phenolic-substituted isocyanurates or 1,3,5-triazines are used in combination with the thio propionamide compounds, the stabilization achieved far surpasses that obtained with either compound alone at the same level or the sum of the individual stabilizer compounds when employed alone. A completely unexpected improvement in the stability of the olefin polymers is realized.

The phenolic substituents are preferably 4-hydroxyaryl groups containing one or two alkyl substituents immediately adjacent (ortho) to the hydroxyl group. The alkyl groups will generally contain from about one to 18 carbon atoms and more preferably will be tertiary alkyl groups containing from four to 12 carbon atoms. 2,6-Di-tertiary-butyl-4-hydroxyphenyl substituted compounds are particularly advantageous for the present invention.

Substitution of the phenolic group onto the isocyanurate or 1,3,5-triazine rings may be achieved through a variety of linkages. For example, the phenolic moiety may be bonded to a carbon atom of the heterocyclic ring through an oxygen atom, a sulfur atom, an imino or substituted imino group, a carboxyl group, an alkylene group or the like. In a similar manner the phenolic substituent can be bonded to a nitrogen atom of the heterocyclic nucleus. The latter is especially advantageous with isocyanurates. In either instance, however, one, two or three phenolic moieties may be substituted.

Particular advantage is realized when thio propionamides are employed in combination with hydroxyphenylalkyleneyl isocyanurates of the general formula

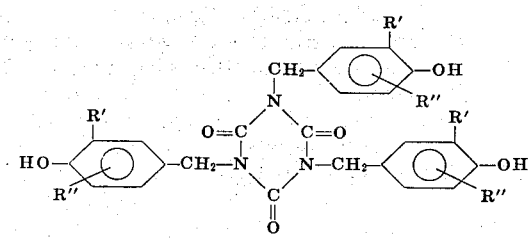

wherein R' is an alkyl group containing from one to 18 carbon atoms and more preferably a tertiary alkyl group containing from four to eight carbon atoms, R" is hydrogen or an alkyl group containing from one to 18 carbon atoms and preferably a tertiary alkyl group containing four to eight carbon atoms positioned ortho to the hydroxyl group. Such compounds of the above type include: tris-(3-methyl-4-hydroxybenzyl)isocyanurate, tris-(3-t-butyl-4-hydroxybenzyl)isocyanurate, tris-(3-t-amyl-4-hydroxybenzyl) isocyanurate, tris-(3-octyl-4-hydroxybenzyl)isocyanurate, tris-(3,5-dimethyl-4-hydroxybenzyl)isocyanurate, tris-(3,5-diisopropyl-4-hydroxybenzyl)isocyanurate, tris-(3-cyclohexyl-4-hydroxybenzyl)isocyanurate, tris-(3,5-di-t-butyl-4-hydroxybenzyl)isocyanurate, tris-(3-t-butyl-5-t-amyl-4-hydroxybenzyl)isocyanurate, tris-(3,5-di-t-amyl-4-hydroxybenzyl)isocyanurate, tris-[3,5-di-(1-methyl-1-ethylpropyl)-4-hydroxybenzyl]isocyanurate, tris-[3,5-di-(1,1,2,2-tetramethylpropyl)-4-hydroxybenzyl]isocyanurate, tri-s-[3,5-di-(1,1-dimethylpentyl)-4-hydroxybenzyl]isocyanurate and the like. Also useful are mono- and di-substituted isocyanurates such as bis-(3-methyl-4-hydroxybenzyl)isocyanurate, bis-(3-t-butyl-4-hydroxybenzyl)isocyanurate, bis-(3,5-dimethyl-4-hydroxybenzyl)isocyanurate, bis-(3,5-di-t-butyl- 4-hydroxybenzyl)isocyanurate, 3-methyl-4-hydroxybenzyl isocyanurate, 3-t-butyl-4-hydroxybenzyl isocyanurate, 3,5-dimethyl-4-hydroxybenzyl isocyanurate, 3,5-di-t-butyl-4-hydroxybenzyl isocyanurate, bis-(3-methyl-4-hydroxybenzyl)hexyl isocyanurate, bis-(3-t-butyl-4-hydroxybenzyl) hexyl isocyanurate, bis-(3,5-di-t-butyl-4-hydroxybenzyl)hexyl isocyanurate, bis-(3,5-di-t-butyl-4-hydroxybenzyl)octadecyl isocyanurate, as well as other structurally related isocyanurates which are more fully described in copending applications Ser. No. 770,863 now U.S. Pat. No. 3,531,483 and Ser. No. 770,846 now U.S. Pat. No. 3,598,815.

In addition to the above-mentioned phenolic-substituted isocyanurates, excellent activity is observed when the bis- alkylthio propionamides are combined with 4-hydroxyaryl-substituted s-triazines such as: hexahydro-1,3,5-tris[β-(3,5-di-t-butyl-4-hydroxyphenyl)propionyl]-s-triazine, hexahydro-1,3,5-tris[β-(3,5-di-t-amyl-4-hydroxyphenyl)propionyl]-s-triazine, hexahydro-1,3,5-tris[β-(3-t-butyl-5-t-amyl-4-hydroxyphenyl)propionyl]-s-triazine, hexahydro-1,3,5-tris[β-(3,5-di-1-methyl-1-ethylpropyl-4-hydroxyphenyl)propionyl]-s-triazine, hexahydro-1,3,5-tris[β-(3,5-di-1,1,2,2-tetramethyl-propyl-4-hydroxyphenyl)propionyl]-s-triazine, hexahydro-1,3,5-tris[β-(3,5-di-1,1-dimethylpentyl-4-hydroxyphenyl)propionyl]-s-triazine, hexahydro-1,3,5-tris[β-(3,5-di-t-butyl-4-hydroxyphenyl)-α-methylpropionyl]-s-triazine, hexahydro-1,3,5-tris[β-(3,5-di-t-amyl-4-hydroxyphenyl)-α-methylpropionyl]-s-triazine, hexahydro-1,3,5-tris[β-(3,5-di-t-butyl-4-hydroxyphenyl)butyryl]-s-triazine, hexahydro-1,3,5-tris[γ-(3,5-di-t-butyl-4-hydroxyphenyl)butyryl]-s-triazine, 6-(4-hydroxy-3,5-di-t-butylanilino)-2,4-bis-(n-octylthio)-1,3,5-triazine, 6-(4-hydroxy-3,5-di-t-butylanilino)-2,4-bis-(phenylthio)-1,3,5-triazine, 6-(4-hydroxy-3,5-di-t-butylanilino)-2,4-bis-(octadecylthio)-1,3,5-triazine, 6-(4-hydroxy-3,5-di-t-butylanilino)-2,4-bis-cyclohexylthio-1,3,5-triazine, 6-(2-hydroxy-3,5-di-t-butyl-6-methylanilino)-2,4-bis-(n-octylthio)-1,3,5-triazine, 6-(4-hydroxy-3,5-di-t-butylanilino)-2,4-bis-(2,3-dimethylphenylthio)-1,3,5-triazine, 6-(4-hydroxy-3,5-di-t-butylanilino)-2,4-bis-(carbo-n-lauryloxyethylthio)-1,3,5-triazine, 6-(4-hydroxy-3,5-di-t-butylanilino)-2,4-bis-(4-t-octylphenoxy)-1,3,5-triazine, 6-(4-hydroxy-3,5-di-t-butylanilino)-2,4-bis-(2-carbo-n-lauryloxyphenylthio)-1,3,5-triazine, 6-(4-hydroxy-3,5-di-t-butyl-N-benzylanilino)-2,4-bis(n-octylthio)-1,3,5-triazine, 6-(4-hydroxy-3,5-di-t-butylanilino)-4-n-octylthio-2-chloro-1,3,5-triazine, 4,-6-bis-(4-hydroxy-3,5-di-t-butylanilino)-2-chloro-1,3,5-triazine, 6-(4-hydroxy-3,5-di-t-butylphenoxy)-2,4-bis-(phenoxy)-1,3,5-triazine, 2,4,6-tris-(4-hydroxy-3,5-di-t-butylphenoxy)-1,3,5-triazine, 6-(4-hydroxy-3,5-di-t-butylphenoxy)-2,4-bis-(n-octyl-thioethylthio)-1,3,5-triazine, 6-(4-hydroxy-3,5-di-t-butylphenoxy)-2,4-dichloro-1,3,5-triazine, 6-(4-hydroxy-3,5-di-t-butylphenoxy)-2,4 -bis-(n-octylthiopropylthio)-1,3,5-triazine, 2,4,6-tris-(4-hydroxy-3-methyl-5-t-butylphenoxy)-1,3,5-triazine, 2,4-bis-(4-hydroxy-3,5-di-t-butylphenoxy)-6-dodecylamino-1,3,5-triazine, 2,4-bis-(4-hydroxy-3,5-di-t-butylphenoxy)-6-amino-1,3,5-triazine, 2,4-bis-(4-hydroxy-3,5-di-t-butylphenoxy)-6-(n-octylthio)-1,3,5-triazine, 2,4-bis-(4-hydroxy-3,5-di-t-butylphenoxy)-6-(n-octylthiopropylthio)-1,3,5-triazine, 6-(4-hydroxy-3,5-di-t-butylphenylthio)-2,4- bis-(ethylthio)-1,3,5-triazine, 6-(4-hydroxy-3,5-di-*t*-butylphenylthio)-2,4-bis-(phenylthio)-1,3,5-triazine, 6-(4-hydroxy-3,5-di-*t*-butylphenylthio)-2,4-bis-(*n*-octylamino)-1,3,5-triazine, 6-(4-hydroxy-3,5-di-*t*-butylphenylthio)-2,4-bis-(*n*-octyloxy)-1,3,5-triazine, 6-(4-hydroxy-3,5-di-*t*-butylphenylthio)-2-mercapto-4-*n*-octadecylthio-1,3,5-triazine, 6-(4-hydroxy-3,5-di-*t*-butylphenylthio)-2,4-bis-(4-*t*-butylphenoxy)-1,3,5-triazine, 2,4,6-tris-(4-hydroxy-3,5-di-*t*-butylphenylthio)-1,3,5-triazine, 2,4-bis-(4-hydroxy-3,5-di-*t*-butylphenylthio)-6-(*n*-dodecylamino)-1,3,5-triazine, 2,4-bis-(4-hydroxy-3,5-di-*t* -butylphenylthio)-6-amino-1,3,5-triazine, and the like.

The stabilizer systems of the present invention are useful to prevent degradation of olefin polymers. Although polypropylene and polyethylene are most advantageously stabilized, the present compositions are equally effective to stabilize other polyolefins derived from α-olefins containing up to about eight carbon atoms such as poly-4-methylpentene-1, polybutene and the like. They are also useful to stabilize polyolefin copolymer compositions such as ethylene-propylene copolymers. Physical mixtures of olefin homopolymers and copolymers are also stabilized according to the present invention. The polyolefins may be of high density, medium density or low density. The stabilized polyolefinic materials are useful for thermoplastic molding and coating applications as well as having a wide variety of other applications well known to the art.

When employing the present combinations of stabilizers, the total amount of the stabilizer system will be between 0.01 percent and 5 percent by weight based on the total stabilized composition. Excellent results have been obtained when the total concentration of stabilizer components is between about 0.1 percent and 3 percent by weight based on the total stabilized composition. The weight ratio of the thio propionamide to the phenolic-substituted isocyanurate or 1,3,5-triazine will be varied between about 5:1 and 1:5 to obtain enhanced activity. Marked synergistic activity is obtained when the stabilizer components are employed in about a 1:1 weight ratio.

The stabilizer systems are readily incorporated employing conventional methods into the polyolefin and generally require no special processing. They are added to the polymers by mixing on a mill or in a Banbury mixer and may be added, alone, in a suitable solvent or masterbatched with other ingredients, to a solution of the polymer. The ready solubility of the stabilizer components in a wide variety of organic solvents facilitates their use in solution and also renders them compatible with most oils and lubricants. The stabilizer system can be used in conjunction with other compounding ingredients such as processing oils, plasticizers, lubricants, fillers, reinforcing agents and are also compatible with other known oxidative stabilizers, color and heat stabilizers, ultraviolet absorbers and the like.

In addition to the stabilization of polyolefins the present stabilizer systems are also useful to stabilize other polymer compositions, oils, lubricants, saturated and unsaturated hydrocarbons and like materials which are subject to oxidative attack. Polystyrene, for example, or copolymers of butadiene and styrene may be stabilized with the present compounds. Also effectively stabilized are various types of lubricating oils, fatty materials such as the oils of animal and vegetable origin, gasoline, mineral oil, diesel oil, drying oils and resins.

The following Examples serve to illustrate the invention more fully.

EXAMPLE I

N,N'-methylenebis[β-(n-octadecylthio)propionamide] was prepared. 11.3 grams (0.0735 mole) or methylenebis acrylamide, 42.0 grams (0.147 mole) of n-octadecylmercaptan, and 470 milliliters of tetrahydrofuran were put into a reactor vessel and stirred while purging the vessel with nitrogen gas. The mix was a solution of *n*-octadecylmercaptan in THF with the methylenebis acrylamide in suspension. 0.3 grams of sodium methoxide, $NaOCH_3$, was then added. Initial temperature was 24° C., which rose to 34°–36° C. upon addition of the $NaOCH_3$. The mix was then heated to about 60° C. for about 80 minutes, and then allowed to cool down to about 25° C. over the next hour and stirred for 3 more hours. Total reaction time was about 5.5 hours. The reaction mix was then cooled to about 0°–5° C. and the solid material filtered out and dried at room temperature. 38.7 grams of this product was dissolved in a hot THF-10 percent by weight water solvent, and then cooled to precipitate out a solid. This material was air dried and submitted for NMR (nuclear magnetic resonance) spectra. The product obtained was determined to be the desired octadecylthio propionamide. When *n*-dodecylmercaptan was used in place of *n*-octadecylmercaptan, the corresponding N,-N'-methylene-bis-[β-(*n*-dodecylthio) propionamide] was obtained.

Preparation of tris(3,5-di-*t*-butyl-4-hydroxybenzyl) isocyanurate.

A reactor equipped with a stirrer, condenser and dropping funnel was charged with 200 ml. of anhydrous N,N-dimethyl formamide and 16.2 grams (0.2 mol) anhydrous potassium cyanate suspended therein. The reactor and dropping funnel were maintained under a nitrogen blanket throughout the run. The suspension was heated to 130° C. and 51 grams (0.2 mol) 3,5-di-*t*-butyl-4-hydroxybenzyl chloride dissolved in 50 ml. dry N,N-dimethyl formamide added dropwise over a 2 hour period. The reaction mixture was heated with stirring for an additional hour, allowed to cool and poured into ice water. The crude reaction product was recovered by filtration. Purification was achieved by multiple extraction of an ether solution of the crude product with 5 percent aqueous sodium hydrosulfite, water and saturated salt solution. The ether was removed by evaporation and the product recrystallized from methanol and water. 25 grams of the tris(3,5-di-*t*-butyl-4-hydroxybenzyl)isocyanurate melting at 213°–215° C. was obtained. Infrared analysis showed a single carbonyl peak at 1,710 $cm^{-1}$ and no nitrogen-hydrogen linkages. Elemental analysis of the product agreed with the calculated values.

EXAMPLE II

The N,N'-methylene-bis[β-(*n*-octadecylthio) propionamide] and the tris(3,5-di-*t*-butyl-4-hydroxybenzyl)isocyanurate prepared in Example I were mixed with 100 parts by weight of polypropylene and the composition tested for its stability. The stabilizers were incorporated into the polypropylene by dissolving them in benezene, suspending the polypropylene therein, and then evaporating off the benzene under reduced pressure. The stabilized polypropylene was then run through an extruder operating at 60 rpm and at 220°C. A 100 gram sample was taken and pressed in a mold shimmed to the desired thickness (about 20 mils). Press conditions were 3 minutes at 220°C. at 4,000 psi, followed by cooling in the mold under no pressure.

The stabilized samples were hung in an air-circulating oven and heated at 140°C. The samples were deemed to have failed at the first sign of crazing. Test data and results are as follows:

| Sample | Bis-thiopropionamide parts/100 parts | Phenolic isocyanurate parts/100 parts | Hours to failure |
|---|---|---|---|
| 1 | none | none | 3 |
| 2 | none | 0.1 | 145 |
| 3 | 0.25 | 0.1 | 456 |

The example shows the excellent stability of a polypropylene composition containing both the bis-thiopropionamide and phenolic isocyanurate of the present invention. The weight ratio of thiopropionamide to isocyanurate used is 2.5 to 1. Similar results are obtained at other weight ratios of the stabilizers.

The polyethylene samples are prepared by dissolving the stabilizers in acetone, suspending the polyethylene therein, and evaporating off the acetone under reduced pressure. The stabilized samples are then hot milled for about 5 minutes at 300° ± 10° F. The polypropylene is sheeted off and placed in a mold shimmed to the desired thickness. The samples are molded at 400° F. and 4,000 psi for 2 minutes and then transferred to a cold press at 4,000 psi for a 2 minute cooling period. Equally good results are obtained when polyethylene is stabilized with the stabilizer combination of this invention.

EXAMPLE III

Example II was essentially repeated except that the samples were tested at 150° C. The compositions and test results are as follows:

| Sample | Thio-propionamide[1] millimoles | parts | Phenolic isocyanurate[2] millimoles | parts | Hours to crazing |
|---|---|---|---|---|---|
| 1 | 1.0 | 0.73 | — | — | 96 |
| 2 | — | — | 1.0 | 0.75 | 184 |
| 3 | 0.5 | 0.36 | 0.5 | 0.38 | 320 |

[1] N,N'-methylene-bis(β-n-octadecylthio)propionamide
[2] tris(3,5-di-t-butyl-4-hydroxybenzyl)isocyanurate The example demonstrates that at about a 1 to 1 weight ratio of bis-thiopropionamide to phenolic isocyanurate (a 1 to 1 millimole ratio herein), very marked synergism is obtained. Sample 3 has almost twice the stability that either stabilizer alone imparts to the polypropylene.

EXAMPLE IV

It is important that the $R_1$ groups on the bis-thiopropionamides contain at least six carbon atoms, and preferably from eight to about 18 carbon atoms. The size and structure of the $R_1$ group gives the compound increased solubility in the polyolefin and also makes the compound less volatile at processing and operational temperatures. The compositions of the present invention were compared to compositions suggested in the art. U.S. Pat. No. 2,792,307, in Example 3, recites the preparation and use of N,N'-methylene-bis(β-ethylthio)propionamide as a stabilizer. U.S. Pat. No. 3,538,092, in Example 6, recites the use of 2,4-bis-(3,5-di-$t$-butyl-4-hydroxyphenoxy)-6-($n$-octylthio)-1,3,5-triazine with mercaptopropionyl-$s$-triazine to stabilizer polypropylene. Comparisons with the art compositions were made on an equal mole basis. Compositions were prepared following the procedure in Example II, and tested for their stability at 150° C. in an air-circulation oven. Test results and compositions are as follows:

| | 1 | 2 | 3 |
|---|---|---|---|
| Polypropylene parts by weight | 100 | 100 | 100 |
| Tris-(3,5-di-t-butyl-4-hydroxybenzyl)isocyanurate millimoles | 0.5 | 0.5 | — |
| N,N'-methylene-bis-(β-n-octadecylthio)propionamide millimoles | 0.5 | — | — |
| N,N'-methylene-bis-(β-ethylthio)propionamide millimoles | — | 0.5 | 0.5 |
| 2,4-bis(3,5-di-t-butyl-4-hydroxyphenoxy)-6-(n-octylthio)-1,3,5-triazine millimoles | — | — | 0.5 |
| Hours to crazing | 320 | 96 | 152 |

Sample 1 is a composition of the present invention. Samples 2 and 3 both employ the ethylthio compound used in U.S. Pat. No. 2,792,307. It is evident that the octadecylthio compound used in Sample 1 yields a much more stable composition than Samples 2 and 3. Sample 3 uses a combination suggested by U.S. Pat. No. 3,538,092 with the β-ethylthio compound used in place of the mercaptopropionyl-s-triazine. Again, it is evident that Sample 1, of the present invention, offers much greater stability upon oven aging.

In addition to the stabilizer systems employed above N,N'-methylene-bis[β-(n-dodecylthio)propionamide] was employed to stabilize polypropylene in combination with tris(3-methyl-4-hydroxybenzyl)isocyanurate and hexahydro-1,3,5-tris[β-(3,5-di-$t$-butyl-4-hydroxyphenyl)propionyl]-$s$-triazine. The stabilities of these samples were, in all instances, markedly improved over that of unstabilized polypropylene or of polypropylene containing the stabilizer components individually. The polypropylene stabilized in this manner

I claim:

1. A composition comprising a polyolefin polymer and from about 0.01 percent to about 5 percent by weight based upon the total weight of the composition of a stabilizer system comprising (a) a bis-thiopropionamide of the formula

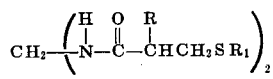

wherein R is hydrogen or a methyl radical, and $R_1$ is selected from the group consisting of an alkyl radical containing from eight to 24 carbon atoms and an aryl, aralkyl, or alkaryl radical containing six to 20 carbon atoms, and (b) a phenolic stabilizer of the formula

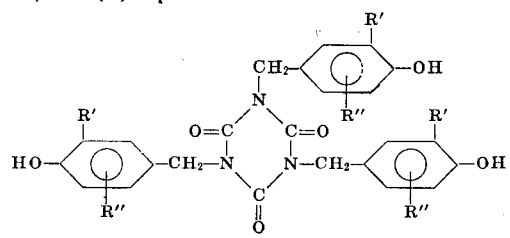

wherein R' is an alkyl group containing from one to 18 carbon atoms and R'' is hydrogen or an alkyl group containing from one to 18 carbon atoms.

2. A composition of claim 1 wherein the polyolefin polymer is polyethylene or polypropylene, and the stabilizer system is present in from about 0.1 percent to about 3 percent by weight of the composition.

3. A composition of claim 2 wherein (b) R' and R'' are tertiary alkyl radicals containing four to eight carbon atoms.

4. A composition of claim 3 wherein (a) $R_1$ is an alkyl radical containing from eight to about 18 carbon atoms.

5. A composition of claim 4 wherein (b) is tris(3,5-di-$t$-butyl-4-hydroxybenzyl)isocyanurate.

6. A composition of claim 5 wherein the weight ratio of (a) to (b) is about 1 to 1.

7. A composition of claim 6 wherein (a) is N,N'-methylene-bis($\beta$-dodecylthio)propionamide.

8. A composition of claim 6 wherein (a) is N,N'-methylene-bis($\beta$-octadecylthio)propionamide.

* * * * *